United States Patent [19]

Moertel et al.

[11] 4,153,489

[45] May 8, 1979

[54] SLIDE FASTENER CHAIN WITH WIDE GAP AND METHOD AND APPARATUS FOR MANUFACTURE

[75] Inventors: George B. Moertel, Conneautville; James R. Johnston, Meadville, both of Pa.

[73] Assignee: Textron Inc., Providence, R.I.

[21] Appl. No.: 828,067

[22] Filed: Aug. 26, 1977

Related U.S. Application Data

[62] Division of Ser. No. 689,415, May 24, 1976, Pat. No. 4,054,973.

[51] Int. Cl.$^2$ .................. B29C 27/08; A41M 37/00
[52] U.S. Cl. .................... 156/73.3; 156/66; 156/580.2
[58] Field of Search ................ 156/66, 73.3, 580.1, 156/580.2, 515

[56] References Cited

U.S. PATENT DOCUMENTS

| | | | |
|---|---|---|---|
| Re. 25,935 | 12/1965 | Porepp | 156/66 |
| 3,510,379 | 5/1970 | Heimberger | 156/66 |
| 3,748,709 | 7/1973 | Potin | 156/73.3 |
| 3,859,150 | 1/1975 | Van Amburg | 156/73.3 |
| 4,054,973 | 10/1977 | Moertel et al. | 24/205 R |

*Primary Examiner*—Douglas J. Drummond
*Attorney, Agent, or Firm*—O'Brien and Marks

[57] ABSTRACT

A gap is formed in a slide fastener chain by cutting out a section of the interlocking fastening elements and the inner longitudinal edge portions of tapes supporting the fastening elements to be removed. A narrow band bordering the gap is formed by compressing and fusing thermoplastic threads in the tapes adjacent the gap.

8 Claims, 8 Drawing Figures

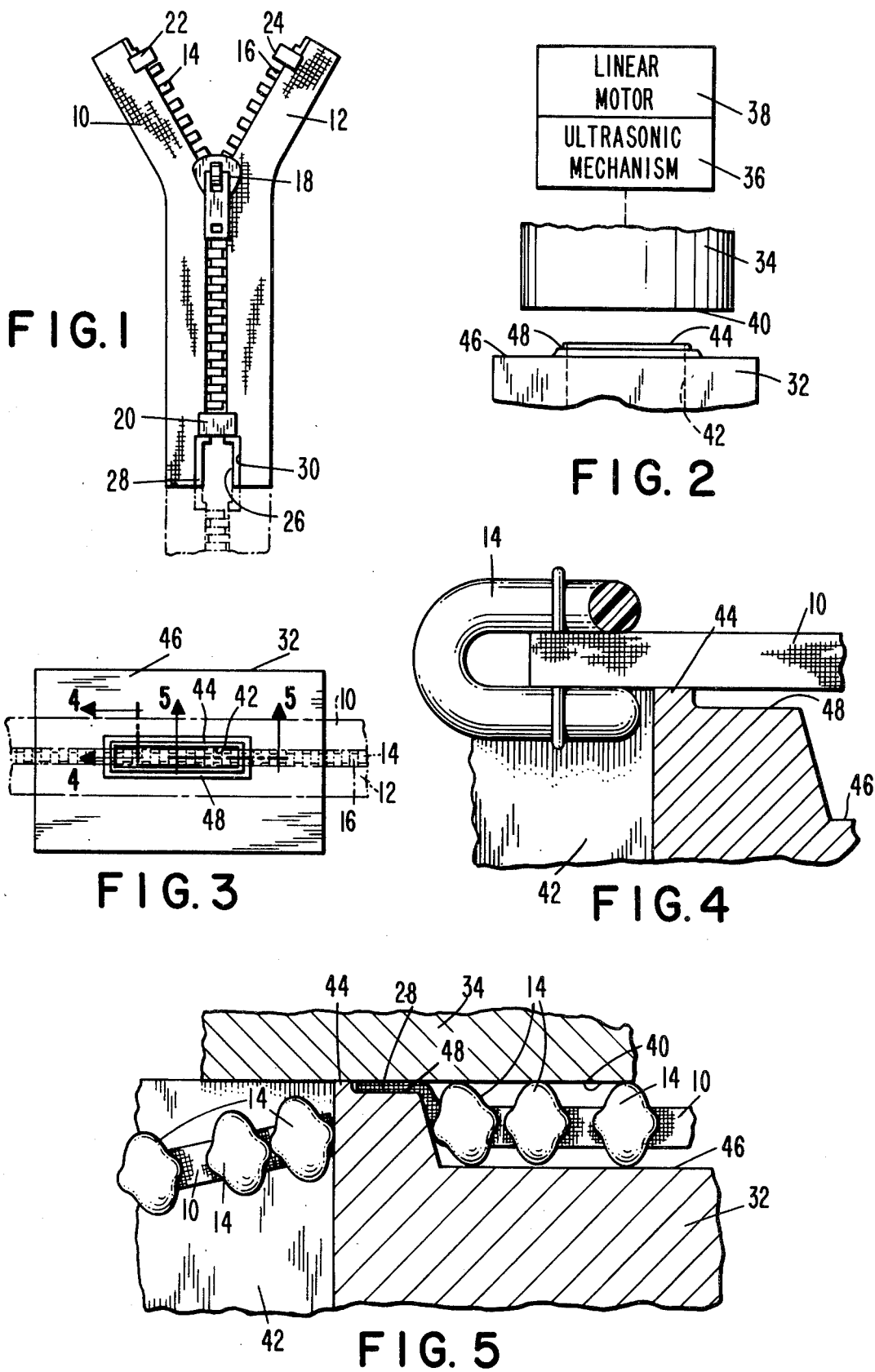

SLIDE FASTENER CHAIN WITH WIDE GAP AND METHOD AND APPARATUS FOR MANUFACTURE

CROSS REFERENCE TO RELATED APPLICATION

This is a divisional application of U.S. application Ser. No. 689,415 filed May 24, 1976, now U.S. Pat. No. 4,054,973.

BACKGROUND OF THE INVENTION

1. Field of the Invention

The invention relates to slide fasteners and particularly to chains for slide fasteners gapped by having sections of the interlocking fastening elements removed, as well as to methods and apparatus for manufacturing such chains.

2. Description of the Prior Art

The prior art, as exemplified in U.S. Pat. Nos. 2,619,148; 3,001,904; 3,340,594; 3,488,239; 3,510,379; 3,577,292; 3,639,969; 3,748,709; 3,770,552; 3,804,577; and 3,884,738, contains many slide fasteners having chains wherein portions of the rows of slide fastening elements have been removed to form gaps in the chains. Some slide fastener chains are gapped by severing the fastening elements into pieces and removing the pieces from the edges of the tapes and other chains are gapped by pulling the fastening elements from the edges of the tapes; care must be taken in the removal of the fastening elements so that the threads on the inner edge portions of the tapes are not cut to thus avoid unraveling of the carrier tapes supporting the rows of fastening elements. The above U.S. Pat. Nos. 3,001,904; 3,340,594; 3,488,239; and 3,510,379 disclose the reinforcement of the ends of textile stringer tapes by welding thermoplastic foils on or in the tapes. The above U.S. Pat. Nos. 3,577,292; 3,639,969; 3,748,709; 3,770,552; 3,804,577; and 3,884,738 disclose the utilization of ultrasonic energy to fuse articles together including the fusion of fastening elements together at one end of a slide fastener and to cut articles, such as cutting the tapes of a slide fastener chain.

SUMMARY OF THE INVENTION

The invention is summarized in a chain for a slide fastener including a pair of textile carrier tapes containing thermoplastic threads, a pair of rows of interlocking fastening elements secured to the inner longitudinal edge portions of the respective tapes, a gap formed by cutting out a section of the inner longitudinal edge portions and corresponding attached fastening elements including several of the fastening elements of each row, and said carrier tapes having respective bands bordering said gap wherein the tapes are reduced in cross section and the thermoplastic threads are fused together.

An object of the invention is to remove the supporting portions of inner longitudinal edges of carrier tapes along with the interlocking fastening elements to form a wide gap in a slide fastener chain.

Another object of the invention is to form a fused area around a cut-out portion of the tape threads.

It is also an object of the invention to cut fastening elements from a section of a slide fastener chain by severing the inner tape edge portions supporting the fastening elements and to substantially simultaneously form laundry and abrasion resistant severed tape edges which are not susceptible to fray and unraveling.

One advantage of the invention is that a wide gap is formed which allows for easier insertion of a slider on a slide fastener chain.

One feature of the invention is that gapping a slide fastener chain is made by a simple reliable process using simple reliable apparatus.

Other objects, advantages and features of the invention will become apparent from the following description of the preferred embodiment taken in conjunction with the accompanying drawings.

BRIEF DESCRIPTION OF THE DRAWINGS

FIG. 1 is a plan view of a slide fastener in accordance with the invention.

FIG. 2 is a schematic illustration of an apparatus for manufacturing the slide fastener of FIG. 1 in accordance with the invention.

FIG. 3 is a plan view of an anvil of the apparatus of FIG. 2.

FIG. 4 is a cross section view taken along lines 4—4 of FIG. 3.

FIG. 5 is a cross section view taken along line 5—5 of FIG. 3.

DESCRIPTION OF THE PREFERRED EMBODIMENT

Figure 6:
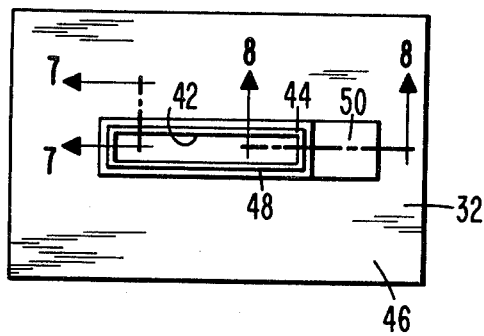
FIG. 6 is a plan view of a modification of the anvil of the apparatus of FIG. 1.

As illustrated in FIG. 1, a slide fastener made in accordance with the invention includes a pair of carrier tapes 10 and 12 having respective rows of fastening elements 14 and 16 attached to longitudinal inner edge portions of the tapes 10 and 12. The tape 10 and the row of fastening elements 14 form a left stringer as viewed in FIG. 1 while the tape 12 and the row of fastening elements 16 form a right stringer. When the interlocking elements 14 and 16 are meshed together, the left and right stringers form a chain for the slide fastener. A slider 18 is slidably positioned over the rows of fastening elements 14 and 16 for opening and closing the slide fastener. A conventional bottom stop 20 is attached over the lower ends of the rows of fastening elements 14 and 16 to secure the bottom ends of the stringers together and to limit downward movement of the slider 18. Conventional top stops 22 and 24 are suitably formed on the upper ends of the rows of fastening elements 14 and 16 to limit upward movement of the slider 18.

The tapes 10 and 12 are textile tapes which include thermoplastic threads, for example, nylon or polyester threads. The fastening elements 14 and 16 may be formed from a continuous filament which is bent into a coil or meander pattern and suitably formed to form head portions forming the interlocking elements 14 and 16, or the fastening elements 14 and 16 may be formed from discrete or interconnected trains of elements such as molded metal or plastic fastening elements attached to the inner edges of the tapes 10 and 12.

The lower and/or upper end of the slide fastener has a gap 26 formed therein wherein several of each of the fastening elements 14 and 16 have been removed along with the inner edge portions of the tapes 10 and 12 supporting the removed fastening elements. Around the gap 26 including any upper and lower ends thereof, areas or bands 28 and 30 are formed wherein the tapes 10 and 12 are compressed and the thermoplastic threads are fused together sufficiently to produce a ravel free edge with reduced cross section bordering the gap 26.

An apparatus for making the gaps 26 and bands 28 and 30 is shown in FIGS. 2, 3, 4 and 5 and includes a pair of die members such as an anvil 32 and a horn tip 34 of an ultrasonic vibration mechanism 36 which is mounted on a linear motor mechanism 38 for moving the tip 34 against and away from the anvil 32. The bottom face 40 of the tip 34 is flat. The anvil 32 has a vertical slot or opening 42 formed therethrough together with a cutting edge 44 contiguous the opening 42 and raised above the upper surface 46 of the anvil 32. The cutting edge 44 is designed such that it cooperates with the flat face 40 of the tip 34 to sever a section including the inner edge portions of the tapes 10 and 12 supporting several fastening elements of each row of fastening elements 14 and 16 from the chain. A plateau 48 also raised above the surface 46 surrounds the cutting edge 44 but has a lesser height than the cutting edge 44 to cooperate with the face 40 to compress the threads of the tapes 10 and 12 between the plateau 48 and the face 40. The plateau 48 has a width extending from the cutting edge sufficient to hold the threads of the tapes 10 and 12 during ultrasonic vibration of the tip 34 to fuse the thermoplastic threads in the tapes 10 and 12. The height of the plateau 48 and cutting edge 44 above the surface 46 is selected to prevent any compression of the fastening elements 14 and 16 or the tapes 10 and 12 outside of the plateau 48 and cutting edge 44. The combined width of the plateau 48 and the cutting edge 44 is sufficiently small to prevent welding of the elements 14 and 16 together at the ends of the gap.

In forming the slide fastener of FIG. 1, a continuous chain is manufactured. Subsequently the chain is gapped, the slider 18 is installed and the end stops 20, 22 and 24 are applied. Areas or bands 28 and 30 bordering the gaps 26 are formed in the tapes 10 and 12, the bands 28 and 30 having reduced cross section wherein the thermoplastic threads of the tapes are fused. The continuous chain may be cut into the desired lengths of slide fastener at any time prior or after the gapping, the installation of the slider 18, or the application of the end stops 20, 22 and 24.

In operation of the apparatus of FIGS. 2-5 and the performance of the process, the chain formed by the tapes 10 and 12 and the rows of fastening elements 14 and 16 is positioned over the anvil 32 with the fastening elements 14 and 16 to be removed centered over the opening 42. The linear motor mechanism 38 is actuated to lower the flat bottom face 40 of the tip 34 against the cutting edge 44 whereupon a section of chain including several of the fastening elements 14 and 16 of each row and the inner edges of the tapes 10 and 12 to which the several fastening elements are attached are cut or severed from the rest of the slide fastener chain to form the gap 26. The lowering of the horn tip 34 also compresses and grips the bands 28 and 30 of the threads adjacent the gap 26 between the face 40 and the plateau 48. After cutting, the horn tip 34 is raised slightly (sufficient to allow vibration of the tip without danger to the cutting edge 44) and the ultrasonic mechanism 36 is activated. The thermoplastic fibers in the compressed bands 28 and 30 are welded together by the ultrasonic vibration energy transmitted through the horn tip 34 to form a ravel-free edge on the gap 26 as well as to produce a reduced cross section of the tape in the bands 28 and 30.

Alternately, the ultrasonic mechanism can be activated as the horn tip 34 is lowered toward the anvil 32 to thus utilize the ultrasonic energy to aid in the severing of the tapes; the lowering of the tip 34 being sufficient to sever the tapes, but insufficient to cause damage to the cutting edge 44.

In FIGS. 4 and 5 the fastening elements 14 are illustrated as being of the meander continuous filament tupe (the fastening elements 16 not illustrated but being substantially identical). The cut-out edge portions of the tapes 10 and 12 are portions of tape underlying and supporting the leg portions of the meander filament fastening elements.

The fused areas 28 and 30 bond the cut ends of the threads in the tapes 10 and 12 together thus producing a laundry and abrasion resistant strip to prevent tape fray and unraveling of the cut ends of the threads in the tapes. It is noted that a relatively wide gap is formed; which wide gap allows easy insertion of the slider between the tapes 10 and 12. The reduced cross-section of the tapes in the compressed bands 28 and 30 allows easier installation of the slider 18 over the fastening elements 14 and 16. The bands 28 and 30 have widths substantially less than the width of the remaining portions of the carrier tapes adjacent the gap 26 so as not to substantially alter the flexibility and other properties of the tapes 10 and 12 adjacent the gap 26.

Figure 7:
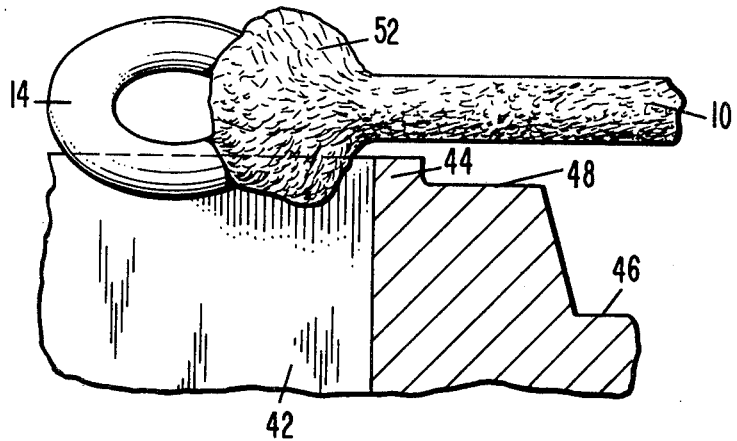
FIG. 7 is a cross section view taken along line 7—7 of FIG. 6.
Figure 8:
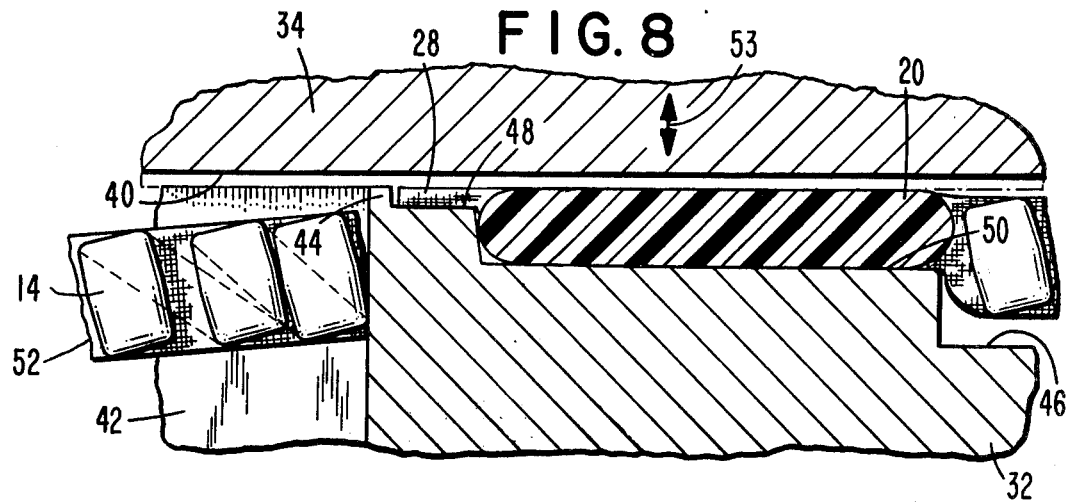
FIG. 8 is a cross section view taken along line 8—8 of FIG. 6.

In the modification illustrated in FIGS. 6, 7 and 8 a plateau 50 is formed on the anvil 32 aligned with the fastening elements 14 and 16 and has a height selected to cooperate with the face 40 of the horn tip 34 such that the fastening elements 14 and 16 are fused together to form the bottom stop 20 for the slide fastener. Also, as illustrated in FIG. 7, the fastening elements 14 and 16 (the latter not shown) are of the spiral or coil filament and the tapes 10 and 12 (the latter not shown) include textile beads 52 on the inner edges of the tapes supporting the coil filament. The inner edge portions of the tapes including lengths of beads 52 are severed from the tapes during the formation of the gap 26 along with the severing of lengths of the coil filaments. In FIG. 8, the horn 34 is illustrated as being slightly spaced above the cutting edge 44 to prevent damage to the cutting edge 44, but sufficiently close to the anvil 32 so that the ultrasonic vibrations as shown by the arrows 53 and phantom lines sever the tapes and fuse the bottom stop 20 and band 28.

Since many variations, modifications and changes in detail may be made to the above described embodiments, it is intended that all matter in the foregoing description and shown in the accompanying drawings be interpreted as illustrative and not in a limiting sense.

What is claimed is:

1. A method of gapping a slide fastener chain comprising
    cutting out a section of the chain including several interlocking fastening elements of each stringer of the chain along with respective inner edge portions of the carrier tapes supporting the several fastening elements,
    compressing and fusing thermoplastic threads of the carrier tapes in a band bordering the cutout section,
    said cutting out and compressing being performed by engaging a pair of die members with the chain wherein the die members have a cutting edge defining the cut out section and have a plateau around the cutting edge defining the band, and said fusing being performed by applying ultrasonic vibrations to one of the pair of die members.

2. A method of gapping a slide fastener chain as claimed in claim 1 wherein said cutting out and compressing are performed by positioning the chain on an upper face of an anvil having a vertical opening and a raised cutting edge surrounding the cutting edge along with a plateau surrounding the cutting edge at a lesser height than the cutting edge, forcing a lower face of a horn tip downward toward the cutting edge to sever the cutout section from the chain and to compress together the threads in the band bordering the cutout section between the plateau and upper face, and said fusing is performed by applying ultrasonic vibrations to the horn tip.

3. A method of gapping a slide fastener chain as claimed in claim 2 wherein ultrasonic vibrations are applied to the horn tip during the forcing step to aid in the severing of the cutout section.

4. An apparatus for gapping a slide fastener chain which has a pair of tapes including thermoplastic threads and which has a pair of rows of interlocking fastening elements secured to inner longitudinal edge portions of the respective tapes, the apparatus comprising a pair of members means for forcing the pair of members together, one of said pair of members being an anvil having an opening and a cutting edge surrounding the opening for cooperating with the other member to cut out a section of both rows of interlocking fastening and inner edge portions of the carrier tapes of the chain from the chain when the members are forced together, said anvil further having a raised plateau surrounding the cutting edge for compressing bands of the carrier tapes bordering the cutout section, and means for applying ultrasonic vibration energy to one of the pair of members to fuse the thermoplastic threads in the bands together.

5. An apparatus as claimed in claim 4 wherein said ultrasonic vibration energy applying means includes means for applying ultrasonic vibrations to the member opposite to the anvil.

6. An apparatus as claimed in claim 5 wherein the cutting edge is a raised cutting edge extending above the plateau, and the other member includes a horn tip having a flat face for cooperating with the raised cutting edge to sever the section from the chain and to cooperate with the raised plateau to compress and fuse the threads in the bands bordering the cutout section.

7. An apparatus as claimed in claim 6 wherein the interlocking fastening elements are thermoplastic, and the anvil includes another raised plateau for cooperating with the flat face of the horn tip to fuse several of the remaining fastening elements of each row together to form a bottom stop on the fastener chain.

8. An apparatus as claimed in claim 6 wherein the rows of interlocking fastening elements are head portions formed from respective continuous thermoplastic filaments; and the raised cutting edge and plateau have a width designed to prevent welding of the head portions together.

* * * * *